(12) United States Patent
Anderson

(10) Patent No.: US 6,964,126 B1
(45) Date of Patent: Nov. 15, 2005

(54) TREE STABILIZING ASSEMBLY

(76) Inventor: Dennis L. Anderson, 3325 Mayfield Dr., Rescue, CA (US) 95672

(*) Notice: Subject to any disclaimer, the term of this patent is extended or adjusted under 35 U.S.C. 154(b) by 0 days.

(21) Appl. No.: 11/080,954

(22) Filed: Mar. 16, 2005

(51) Int. Cl.⁷ ............................ A01G 17/14; A01G 9/12
(52) U.S. Cl. ....................... 47/42; 47/47; 47/43; 47/44; 47/45; 248/511; 248/530
(58) Field of Search ................................ 47/42, 44–47, 47/40.5, 32.4, 32.5; A01G 9/12, 17/04, 17/12, A01G 17/14; 248/511–513, 530, 534, 540, 248/539; 256/20, 23, 65.01, 1, 65.02, 65.03, 256/65.06, 68

(56) References Cited

U.S. PATENT DOCUMENTS

| | | | | |
|---|---|---|---|---|
| 2,241,001 A | * | 5/1941 | Peterson | 47/47 |
| 3,026,650 A | * | 3/1962 | Miller | 47/46 |
| D214,330 S | * | 6/1969 | Maxwell | D8/1 |
| 3,521,401 A | | 7/1970 | Shisler | |
| D218,907 S | * | 10/1970 | Maxwell | D8/1 |
| 3,638,814 A | * | 2/1972 | Lowery | 211/189 |
| 4,658,737 A | | 4/1987 | Weissberg | |
| D332,729 S | * | 1/1993 | Sessions | D8/1 |
| 5,199,677 A | * | 4/1993 | Sessions | 248/218.4 |
| D408,230 S | | 4/1999 | Evans | |
| 5,966,867 A | * | 10/1999 | Downer et al. | 47/46 |
| 6,073,391 A | | 6/2000 | Tort et al. | |
| 6,408,569 B1 | | 6/2002 | Obregon | |
| 6,702,239 B2 | | 3/2004 | Boucher | |
| 6,708,446 B2 | * | 3/2004 | Ambrose | 47/42 |
| 2005/0039394 A1 | * | 2/2005 | Kelly | 47/45 |

FOREIGN PATENT DOCUMENTS

| | | | | | |
|---|---|---|---|---|---|
| CH | 659848 A5 | * | 2/1987 | | A01G 13/10 |
| DE | 3810570 A1 | * | 10/1989 | | A01G 17/12 |
| EP | 0979601 A1 | * | 8/1998 | | A01G 9/12 |
| GB | 2400007 A | * | 6/2004 | | A01G 17/04 |
| JP | 2002101774 A | * | 4/2002 | | A01G 17/14 |

* cited by examiner

*Primary Examiner*—Peter M. Poon
*Assistant Examiner*—Andrea M. Valenti

(57) ABSTRACT

An assembly includes a plurality of elongated and rectilinear support posts having opposed end portions. The assembly further includes a plurality of U-shaped fastening members removably positional through a primary support member. The primary support member is provided with first and second pairs of arcuate indentations formed along the front face of the primary support member. A bracket including attachable first and second sections is medially situated between the support posts. The first section has opposed end portions conjoined to the front face of the primary support member, and the second section has opposed end portions conjoined to the first section end portions wherein the second section protrudes forwardly of the first section. The first and second pair of indentations are juxtaposed side-by-side and are laterally opposed from the end portions of the first and second sections such that the support posts can abut the bracket during operating conditions.

18 Claims, 2 Drawing Sheets

TREE STABILIZING ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to plant support apparatuses and, more particularly, to a tree stabilizing assembly for supporting recently installed trees.

2. Prior Art

Successful planting of woody perennials such as shrubs, bushes and trees (hereinafter collectively referred to as woody perennials) is more complex and demanding than planting annuals. Woody perennials are long-lived plants that are set into their permanent locations. Often they are planted for the fruit or flowers they bear. Some fruiting varieties, even when planted properly, will not produce a sizable crop of fruit for several years until the plant has become well established. A careless planting might unfortunately retard that crop by an additional year or two. In addition, woody perennials and their roots are generally larger when planted than those of annuals, and thus require larger planting holes. It is obvious that properly placing a large shrub in a large hole is more demanding than planting a small seedling.

There are three main steps to planting a woody perennial. First, a suitably wide and deep planting hole must be dug. Second, the soil that is to fill the hole should be amended to aerate it and enrich it with the proper nutrients required by the plant. Third, the roots of the plant should be placed at the proper depth in the hole and then covered with the amended soil. This soil is then firmed down to eliminate any air pockets, after which the plant is then watered in. At this point, the position of the crown of the plant [the place on the plant where the stem and roots meet] is critical. Ideally, the crown should be at the soil level within the hole, and the top of the hole should be level with the surrounding soil. Clearly, the successful planting of many woody perennials presents numerous difficulties and may impart significant physical strain to the gardener.

Tree and plant support devices have been in use for years. Typically, a user utilizes a plurality of stakes inserted into the ground surrounding the plant with a corresponding plurality of strings attached between the stakes and the plant for supporting the plant from various positions. Such a method, however, is inadequate for woody perennials due to their size, weight, and height.

Accordingly, a need remains for a stable tree support assembly that is easy to install and that does not take up a significant amount of room about the plant, yet is capable of providing support to a woody perennial during all types of weather conditions. The present invention satisfies such a need by providing a tree support assembly that stabilizes recently planted trees and other woody perennials to ensure such a tree grows in an upright plane without leaning. Such an assembly would be easy to attach and install and would enhance the growth and appearance of the tree.

BRIEF SUMMARY OF THE INVENTION

In view of the foregoing background, it is therefore an object of the present invention to provide an apparatus for supporting a tree or the like at a vertical position during installation procedures. These and other objects, features, and advantages of the invention are provided by an assembly including a plurality of elongated and rectilinear support posts having opposed end portions securely nested beneath a ground surface and terminating thereabove at a predetermined height respectively. The support posts are coextensive, laterally spaced apart and maintain a fixed spatial relationship wherein the support posts are registered parallel to the vertical plane.

The assembly further includes a plurality of removably positional and U-shaped fastening members. A primary support member having opposed end portions is securable to top ones of the support post end portions via the fastening members respectively such that the support posts become intercalated between the fastening members and the primary support member. The primary support member has a horizontally registered longitudinal length terminating outwardly of the support posts such that the support posts confront a front face of the primary support member while a rear face of the primary support member is spaced from the support posts.

The primary support member is provided with first and second pairs of arcuate indentations formed along the front face of the primary support member and fully extending between top and bottom surfaces of the primary support member. The primary support member includes a monolithically formed central portion rearwardly flared from the opposed end portions of the primary support member.

A bracket including attachable first and second sections is medially situated between the support posts. Such first and second sections have non-linear and elongated shapes. The first section has opposed end portions conjoined to the front face of the primary support member and the second section has opposed end portions conjoined to the first section end portions wherein the second section protrudes forwardly of the first section. The first and second pair of indentations are coextensive and juxtaposed side-by-side and are laterally opposed from the end portions of the first and second sections such that the support posts can abut the bracket during operating conditions.

The first and second sections preferably include monolithically formed central portions beveled outwardly for defining a passageway therebetween and through which at least one portion of the tree can be positioned during operating conditions. The first and second sections are preferably equidistantly offset from a longitudinal axis spanning orthogonal to the support posts.

The central portion may be rearwardly registered with the bracket in such a manner that the front face of the primary support member travels along a concave path for defining a buffer region and accommodating various sized trees. Such a central portion preferably has a longitudinal length equal to longitudinal lengths of the end portions of the primary support member.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
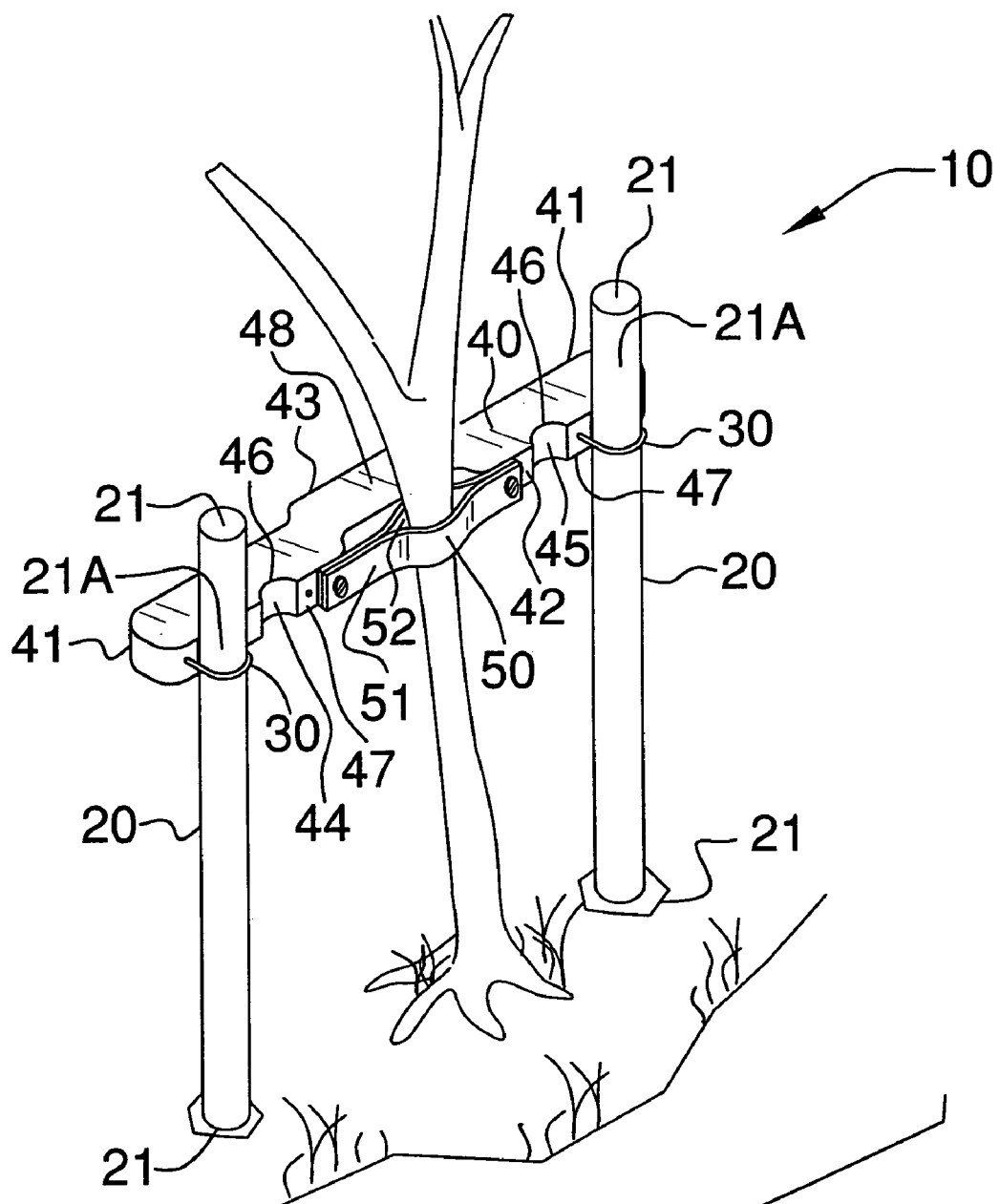
FIG. 1 is a perspective view showing a tree stabilizing assembly, in accordance with the present invention.
Figure 2:
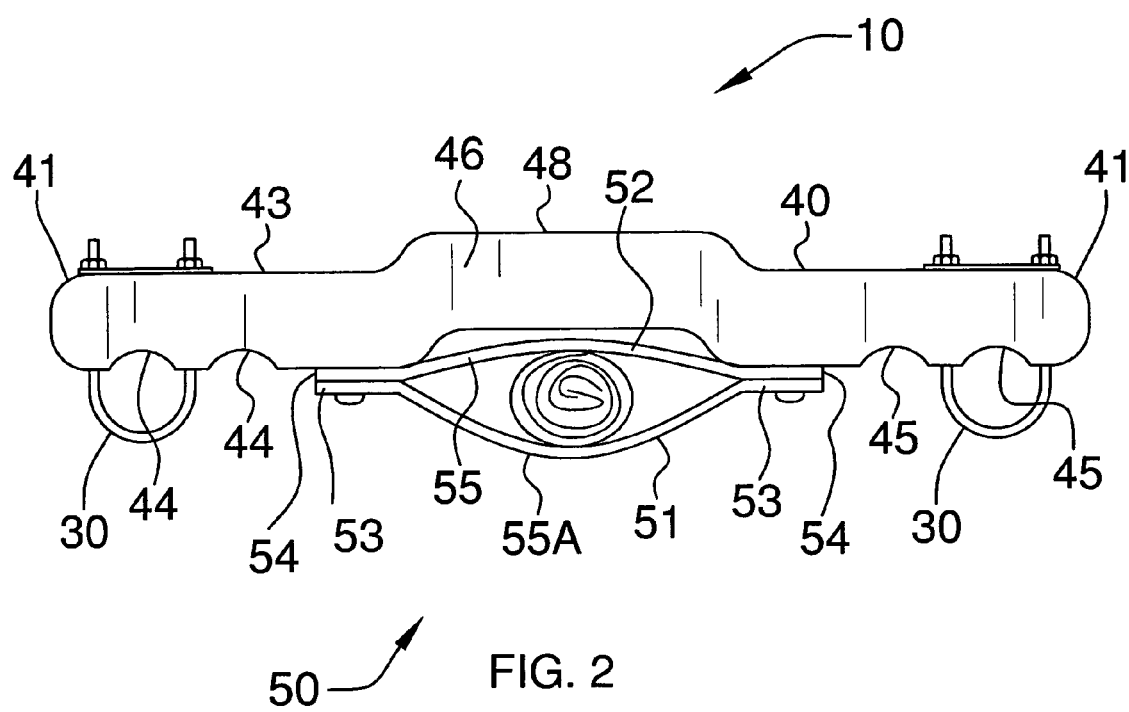
FIG. 2 is a top plan view of the assembly shown in FIG. 1.

The apparatus of this invention is referred to generally in FIGS. 1–2 by the reference numeral 10 and is intended to provide a tree stabilizing assembly. It should be understood that the assembly 10 may be used to stabilize many different types of woody perennials, and should not be limited in use to only trees.

Initially referring to FIG. 1, the assembly 10 includes a plurality of elongated and rectilinear support posts 20 having opposed end portions 21 securely nested beneath a ground surface and terminating thereabove at a predetermined height respectively. Such posts 20 may be anchored beneath a ground surface using cement or other similar material, to provide stability, as is obvious to one having ordinary skill in the art. The support posts 20 are coextensive, laterally spaced apart and maintain a fixed spatial relationship wherein the support posts 20 are registered parallel to the vertical plane. Of course, the posts 20 may be spaced adjacent to the tree as may be needed for saplings and other young woody perennials, as is obvious to one having ordinary skill in the art.

Such posts 20 are preferably formed from wood due to its durability and low cost, but may also be formed from other materials, such as metal, aluminum, concrete, and plastic for example, as well known in the industry. The assembly 10 further includes a plurality of removably positional and U-shaped fastening members 30.

Referring to FIGS. 1 and 2, a primary support member 40 having opposed end portions 41 is securable to top ones 21A of the support post end portions 21 via the fastening members 30 respectively such that the support posts 20 become intercalated between the fastening members 30 and the primary support member 40. The primary support member 40 has a horizontally registered longitudinal length terminating outwardly of the support posts 20 such that the support posts 20 confront a front face 42 of the primary support member 40 while a rear face 43 of the primary support member 40 is spaced from the support posts 20.

The primary support member 40 is provided with first 44 and second 45 pairs of arcuate indentations formed along the front face 42 of the primary support member 40 and fully extending between top 46 and bottom 47 surfaces of the primary support member 40. Such indentations are essential to maintaining stability of the support posts 20 and preferably match the shape of the support posts 20, allowing a user to selectively position the posts 20 where desired and where they may provide the greatest stability. Such indentations also allow a user to position the posts 20 in a ground surface location most conducive to digging so that power or utility lines are not disturbed. Such indentations may also be used to receive trees thereagainst in the case where several trees in close proximity need to be supported.

The primary support member 40 preferably includes a monolithically formed central portion 48 rearwardly flared from the opposed end portions 41 of the primary support member 40. The plurality of U-shaped fastening members 30 are removably positional through the primary support member 40 and centrally registered with selected ones of the first 44 and second 45 pair of indentations in such a manner that the support posts 20 can be adjustably secured to the primary support member 40. Such U-shaped fasteners 30 are critical to maintaining the primary support member 40 securely fastened to the support posts 20.

Referring to FIG. 2, a bracket 50 including attachable first 51 and second 52 sections is medially situated between the support posts 20. Such first 51 and second 52 sections have non-linear and elongated shapes. The first section 51 has opposed end portions 53 conjoined to the front face 42 of the primary support member 40 and the second section 52 has opposed end portions 54 conjoined to the first section end portions 53 wherein the second section 52 protrudes forwardly of the first section 51. The first 44 and second 45 pair of indentations are coextensive and juxtaposed side-by-side and are laterally opposed from the end portions 53, 54 of the first 51 and second 52 sections such that the support posts 20 can abut the bracket 50 during operating conditions.

The bracket 51 and plurality of U-shaped fastening members 30 are preferably formed form galvanized metal or stainless steel, to resist corrosion in an outdoor environment, as well known in the industry. Of course, straps, ties, hooks, nails, and other conventional fastening mechanisms as well known in the industry may also be used, as is obvious to one having ordinary skill in the art.

Still referring to FIG. 2, the first 51 and second sections 52 preferably include monolithically formed central portions 55A, 55 beveled outwardly for defining a passageway therebetween and through which at least one portion of the tree can be positioned during operating conditions. The first 51 and second 52 sections may be equidistantly offset from a longitudinal axis (not shown) spanning orthogonal to the support posts 20. The central portion 55 may be rearwardly registered with the bracket 50 in such a manner that the front face 42 of the primary support member 40 travels along a concave path for defining a buffer region and accommodating various sized trees. Such a central portion 55 preferably has a longitudinal length equal to longitudinal lengths of the end portions 41 of the primary support member 40.

The assembly 10 could be used by homeowners and professional landscapers contracted to care for residential, commercial, and institutional property. Such an assembly 10 saves a property owner time and money by preserving and enhancing the growth of recently planted trees, or trees that may have been partially uprooted by inclement weather conditions, such as hurricanes and tornadoes, and are in need of stability while recovering.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An assembly for supporting a tree or other young woody perennials at a vertical position during installation procedures, said assembly comprising:
   a plurality of elongated and rectilinear support posts having opposed end portions securely nested beneath a ground surface and terminating thereabove at a predetermined height respectively, said support posts being coextensive and laterally spaced apart and maintaining a fixed spatial relationship wherein said support posts are registered parallel to the vertical plane;
   a plurality of U-shaped fastening members;
   a primary support member having opposed end portions securable to top ones of said support post end portions via said fastening members respectively such that said support posts become intercalated between said fastening members and said primary support member, said primary support member having a horizontally registered longitudinal length terminating outwardly of said support posts such that said support posts confront a front face of said primary support member while a rear face of said primary support member is spaced from said support posts, said primary support member being provided with first and second pairs of arcuate indentations formed along said front face of said primary support member and fully extending between top and bottom surfaces of said primary support member; and
   a bracket including attachable first and second sections medially situated between said support posts, said first section having opposed end portions conjoined to said front face of said primary support member, said second section having opposed end portions conjoined to said first section end portions wherein said second section protrudes forwardly of said first section, said first and second sections include monolithically formed central portions beveled outwardly for defining a passageway therebetween and through which at least one portion of the tree can be positioned during operating conditions.

2. The assembly of claim 1, wherein said primary support member includes a monolithically formed central portion rearwardly flared from said opposed end portions of said primary support member.

3. The assembly of claim 2, wherein said central portion is rearwardly registered with said bracket in such a manner that said front face of said primary support member travels along a concave path for defining a buffer region and accommodating various sized trees.

4. The assembly of claim 2, wherein said central portion has a longitudinal length equal to longitudinal lengths of said end portions of said primary support member.

5. The assembly of claim 1, wherein said first and second sections are equidistantly offset from a longitudinal axis spanning orthogonal to said support posts.

6. The assembly of claim 1, wherein said first and second pair of indentations are coextensive and juxtaposed side-by-side, said first and second pair of indentations being laterally opposed from said end portions of said first and second sections such that said support posts can abut said bracket during operating conditions.

7. An assembly for supporting a tree or other young woody perennials at a vertical position during installation procedures, said assembly comprising:
   a plurality of elongated and rectilinear support posts having opposed end portions securely nested beneath a ground surface and terminating thereabove at a predetermined height respectively, said support posts being coextensive and laterally spaced apart and maintaining a fixed spatial relationship wherein said support posts are registered parallel to the vertical plane;
   a plurality of U-shaped fastening members, said fastening members being removably positional;
   a primary support member having opposed end portions securable to top ones of said support post end portions via said fastening members respectively such that said support posts become intercalated between said fastening members and said primary support member, said primary support member having a horizontally registered longitudinal length terminating outwardly of said support posts such that said support posts confront a front face of said primary support member while a rear face of said primary support member is spaced from said support posts, said primary support member being provided with first and second pairs of arcuate indentations formed along said front face of said primary support member and fully extending between top and bottom surfaces of said primary support member; and
   a bracket including attachable first and second sections medially situated between said support posts, said first section having opposed end portions conjoined to said front face of said primary support member, said second section having opposed end portions conjoined to said first section end portions wherein said second section protrudes forwardly of said first section, said first and second sections include monolithically formed central portions beveled outwardly for defining a passageway therebetween and through which at least one portion of the tree can be positioned during operating conditions.

8. The assembly of claim 7, wherein said primary support member includes a monolithically formed central portion rearwardly flared from said opposed end portions of said primary support member.

9. The assembly of claim 8, wherein said central portion is rearwardly registered with said bracket in such a manner that said front face of said primary support member travels along a concave path for defining a buffer region and accommodating various sized trees.

10. The assembly of claim 8, wherein said central portion has a longitudinal length equal to longitudinal lengths of said end portions of said primary support member.

11. The assembly of claim 7, wherein said first and second sections are equidistantly offset from a longitudinal axis spanning orthogonal to said support posts.

12. The assembly of claim 7, wherein said first and second pair of indentations are coextensive and juxtaposed side-byside, said first and second pair of indentations being laterally opposed from said end portions of said first and second sections such that said support posts can abut said bracket during operating conditions.

13. An assembly for supporting a tree or other young woody perennials at a vertical position during installation procedures, said assembly comprising:
  a plurality of elongated and rectilinear support posts having opposed end portions securely nested beneath a ground surface and terminating thereabove at a predetermined height respectively, said support posts being coextensive and laterally spaced apart and maintaining a fixed spatial relationship wherein said support posts are registered parallel to the vertical plane;
  a plurality of U-shaped fastening members, said fastening members being removably positional;
  a primary support member having opposed end portions securable to top ones of said support post end portions via said fastening members respectively such that said support posts become intercalated between said fastening members and said primary support member, said primary support member having a horizontally registered longitudinal length terminating outwardly of said support posts such that said support posts confront a front face of said primary support member while a rear face of said primary support member is spaced from said support posts, said primary support member being provided with first and second pairs of arcuate indentations formed along said front face of said primary support member and fully extending between top and bottom surfaces of said primary support member; and
  a bracket including attachable first and second sections medially situated between said support posts, said first and second sections having non-linear and elongated shapes, said first section having opposed end portions conjoined to said front face of said primary support member, said second section having opposed end portions conjoined to said first section end portions wherein said second section protrudes forwardly of said first section, said first and second sections include monolithically formed central portions beveled outwardly for defining a passageway therebetween and through which at least one portion of the tree can be positioned during operating conditions.

14. The assembly of claim 13, wherein said primary support member includes a monolithically formed central portion rearwardly flared from said opposed end portions of said primary support member.

15. The assembly of claim 14, wherein said central portion is rearwardly registered with said bracket in such a manner that said front face of said primary support member travels along a concave path for defining a buffer region and accommodating various sized trees.

16. The assembly of claim 14, wherein said central portion has a longitudinal length equal to longitudinal lengths of said end portions of said primary support member.

17. The assembly of claim 13, wherein said first and second sections are equidistantly offset from a longitudinal axis spanning orthogonal to said support posts.

18. The assembly of claim 13, wherein said first and second pair of indentations are coextensive and juxtaposed side-by-side, said first and second pair of indentations being laterally opposed from said end portions of said first and second sections such that said support posts can abut said bracket during operating conditions.

* * * * *